United States Patent [19]

Lundberg

[11] Patent Number: 5,844,775
[45] Date of Patent: *Dec. 1, 1998

[54] MOUSE CABLE HOLDER

[75] Inventor: Steven W. Lundberg, 4611 Wooddale, Edina, Minn. 55424

[73] Assignee: Steven W. Lundberg, Edina, Minn.

[*] Notice: This patent issued on a continued prosecution application filed under 37 CFR 1.53(d), and is subject to the twenty year patent term provisions of 35 U.S.C. 154(a)(2).

[21] Appl. No.: 686,311

[22] Filed: Jul. 25, 1996

[51] Int. Cl.$^6$ .................................................. G06F 1/16
[52] U.S. Cl. ........................................ 361/683; 174/135
[58] Field of Search ................................. 361/683, 686, 361/680, 681; 248/51, 52, 316.7, 346.01; D19/56; 174/135, 72 A; 70/15; G06F 1/16

[56] References Cited

U.S. PATENT DOCUMENTS

| | | | |
|---|---|---|---|
| D. 350,947 | 9/1994 | Klinger et al. | D14/114 |
| 4,453,687 | 6/1984 | Sweere | 248/183 |
| 5,228,319 | 7/1993 | Holley et al. | 361/683 |
| 5,287,246 | 2/1994 | Sen | 361/683 |
| 5,339,213 | 8/1994 | O'Callaghan | 361/683 |
| 5,398,895 | 3/1995 | Whetherhult et al. | 248/51 |
| 5,409,107 | 4/1995 | Browne | 206/305 |
| 5,428,355 | 6/1995 | Jondrow et al. | 361/683 |
| 5,433,407 | 7/1995 | Rice | 248/118.1 |
| 5,490,039 | 2/1996 | Helms | 361/683 |
| 5,556,061 | 9/1996 | Dickie | 248/51 |
| 5,579,657 | 12/1996 | Makous | 70/15 |
| 5,593,128 | 1/1997 | Odom et al. | 248/346.01 |
| 5,636,822 | 6/1997 | Hendershot et al. | 248/346.01 |
| 5,670,989 | 9/1997 | Owen | 345/163 |

OTHER PUBLICATIONS

"Mouse Klip™", Product Packaging Information, by American, Covers, Inc. Computer Accessories, 2 pgs, Known Prior to Jul. 25, 1996.

*Primary Examiner*—Lynn D. Feild
*Attorney, Agent, or Firm*—Schwegman, Lundberg, Woessner, and Kluth, P.A.

[57] ABSTRACT

A computer mouse cable holder is provided for holding a mouse cable in a stationary position relative to an area of use of the computer mouse. Numerous embodiments are described including cable holders of a sufficient weight and gripping surface to hold a mouse cable stationary. Mouse cable holders are also described having an adhesive surface for affixing the cable holder. One embodiment of the invention provides a fastener molded as an integral unitary one-piece construction as part of a molded plastic computer component housing, wherein the fastener holds the mouse cable in fixed relation to the component at a point along its length. Further, novel embodiments are described for manufacturing the mouse cable holder.

6 Claims, 5 Drawing Sheets

MOUSE CABLE HOLDER

TECHNICAL FIELD OF THE INVENTION

The present invention pertains generally to computer technology, and more particularly to mouse pointing devices for computers.

BACKGROUND OF THE INVENTION

A mouse pointing device, or "mouse" for short, is used to position a pointer on a screen of a graphical user interface. As used herein, the term mouse refers to any pointing device which has a hand manipulated housing which when moved over a surface such as a mouse pad by a user causes the pointer to move on screen, and wherein the housing is connected to the computer with a physical connector such as an electrical cable. When moved, the mouse produces electrical (or perhaps optical or other electromagnetic) signals which the computer receives and converts to a movement of the pointer that corresponds to the movement of the mouse over the surface.

In order for a user to be able to move a mouse, the connector must have some slack near the housing. Otherwise, the user cannot freely move the housing relative to the surface on which it is resting. However, the connector often tends to fall by its own weight over the back of a desk or through a port in a desk surface (along its path to the rear of the computer in which it is plugged), eliminating the slack. The present invention addresses this problem.

DETAILED DESCRIPTION OF THE INVENTION

Figure 1:
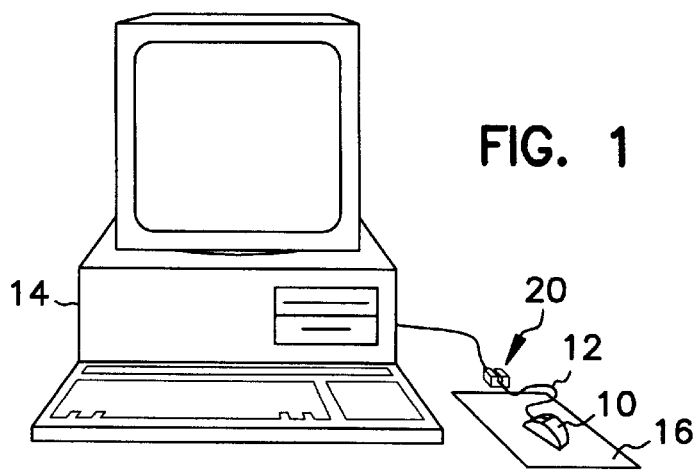
FIG. 1 shows a mouse pointing device connect to a computer with the mouse cable holder according to the present invention positioned between the housing of the mouse and the other end of the cable.

FIG. 1 illustrates a mouse having a hand manipulated housing 10 and a cable 12 running from the housing 10 to the computer 14. The far end of the cable 12 typically has a plug which is plugged into a standard socket on the back connector panel of the computer 14. Cable 12 typically takes the form of an electrical cord with several internal wires contained with a sheath 13 of flexible plastic or rubber type material.

A mouse pad 16 provides a surface optimized for the mechanism used in the housing 10 to detect its movement over the surface. The mechanism most often used is a roller ball mounted in the bottom of the housing so that it rolls on the surface when the housing is moved. The movement of the roller ball is detected inside the housing by well known means, and signals corresponding to the detected movement are applied to the computer through the cable 12.

A connector holder and positioning device 20 is fixed to cable 12 by a gripping action or other mode of fastening, or by trapping the cable 12 between it and the surface of the desk or other furniture supporting the mouse or adjacent to where the mouse is supported. The particular type of gripping or fastening is not critical to the invention, but the device should be specially adapted for this purpose. Preferably, device 20 is fixed to the cable 12 at a point along the cable's length which is in the range of about 12–24 inches away from the mouse, but it can be anchored further away or closer, depending on the stiffness of the cable or other cable attributes or the environment. The device 20 is preferably positioned at a distance from the area over which the housing will be moved in operation so that there is a comfortable amount of slack in the cable 12.

As shown in FIG. 1, one illustrative embodiment of device 20 has a base portion 22 constructed of glass, metal or other material, and a slot 23 on the top into which the cable 12 can be inserted. The slot is preferably shaped and sized so that the cable 12 can be pushed down into and is interference fit into a fixed position. The shape and size thus might vary depending on the size of cable 12 it is designed to grip or hold. The weight of device 20 is adapted to provide that it will not readily move on the surface of the desk under the influence of movement imparted to the cable 12 by the movement of housing 12 in normal operation. For instance, it may have the weight of a common paperweight. The bottom of the base portion 22 may optionally be covered with a slip-resistant or surface gripping material 24, such as rubber. The amount of weight of portion 22 required to keep the device stationary will of course vary depending on how slip resistant the bottom surface is, and how stiff the sheath or wires in cable 12 are.

Figure 2:
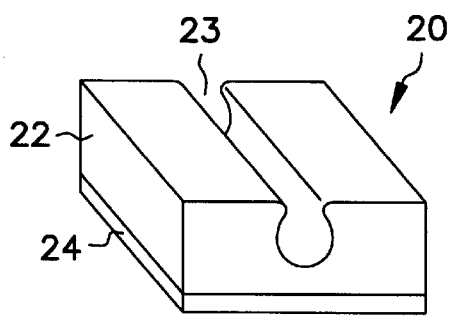
FIGS. 2–18 show various alternate embodiments of the mouse cable holder according to the present invention.
Figure 3:
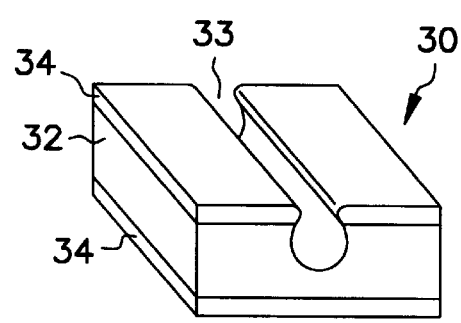

Alternate embodiments of device 20 are shown in FIGS. 2–9. In FIG. 3, device 30 has a cable gripping slot 33, and the base portion 32 is covered on both sides with a gripping surface 34, so that it can be laid on either side, with the cable 12 running along the "bottom," or along the "top" of the device, with reference to the ground.

Figure 4:
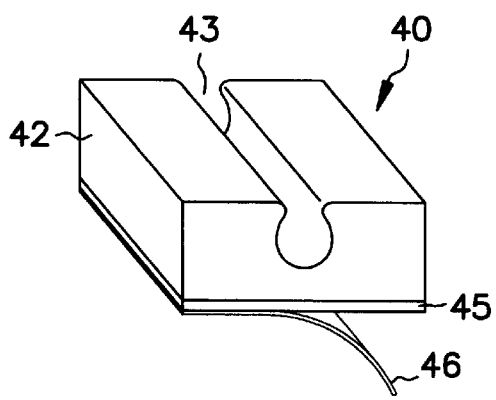

In FIG. 4, device 40 is constructed of a plastic base portion 42 having a cable gripping slot 43 and a sticky, adhesive type material 45 over a surface thereof that can be used to stick the base portion 42 to a surface, such as the surface of a desk or the side of a monitor. The device 40 is packaged for purchase with a peel-off sheet 46 covering the adhesive material. The user then removes the peel-off sheet and sticks the device 40 onto the desired object. The adhesive is preferably of a quality to create a semi-permanent attachment of the device 40 to a surface, such as the side of a computer housing or desktop or the side or back of a desk. In the embodiment of FIG. 4, the base portion 42 can be constructed of a light-weight material. Alternatively, the adhesive material could be applied to the side of base 42 that has the slot 43. It is further contemplated that the base portion 42 can be made as thin as possible so that it takes up as little space as possible.

Figure 5:
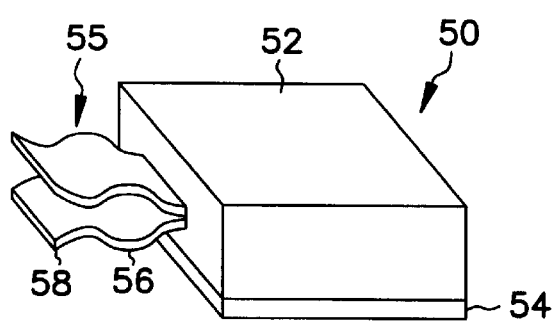
Figure 15:
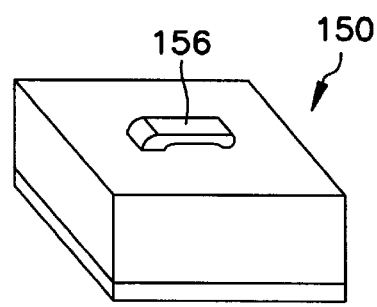

In FIG. 5, there is shown a device 50 with a base portion 52 and a plastic snap 55 with two fingers (one finger could alternatively be used to pinch the cable 12 between the finger and the base portion 52, as shown in FIG. 15) are adapted to receive the cable 12 (usually about ⅛" in diameter) so that it is snaps into place between the fingers, and so that the cable 12 can be pulled free of the fingers to reposition it or install a new mouse. The ends of fingers 58 are flared to allow the cable to be more easily inserted therebetween. The fingers 56 are arranged to trap the connector between them.

Figure 6:
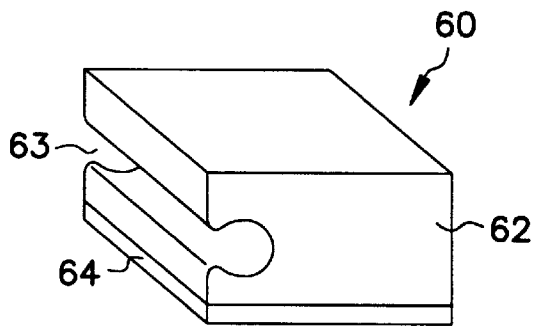
Figure 7:
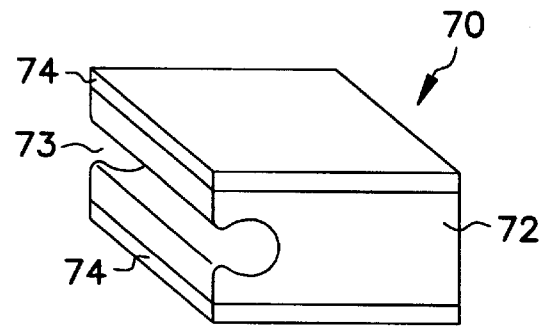
Figure 8:
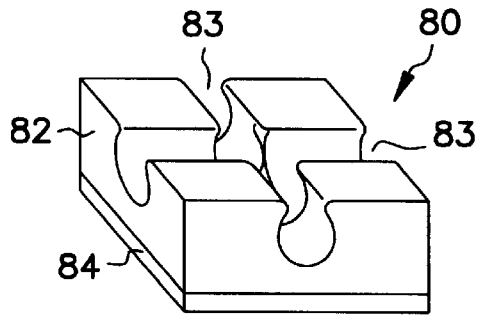
Figure 9:
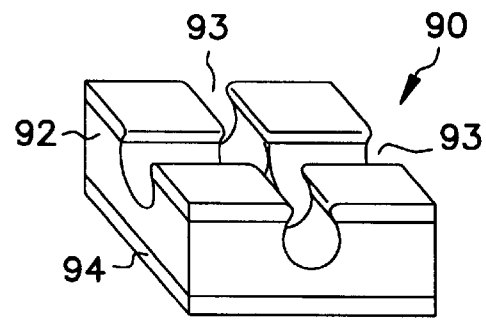
Figure 18:
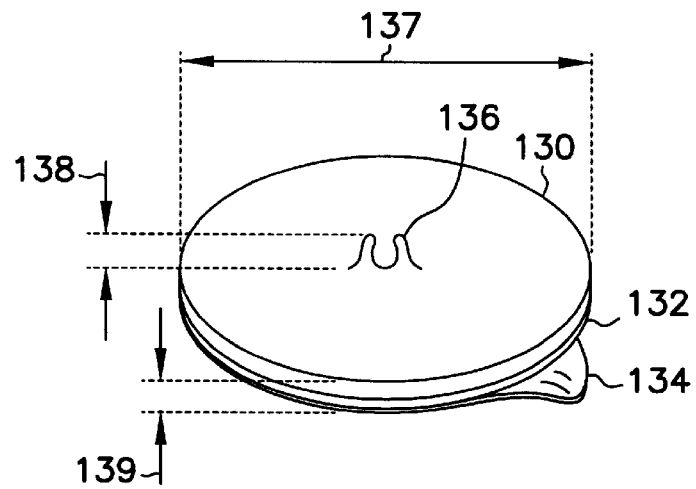

Yet another alternate embodiment is shown in FIG. 6, which is similar in construction to the embodiment of FIG. 2 but with in which the slot 63 disposed on a side thereof, with a gripping material 64 on the bottom thereof. Alternatively, bottom 64 could be an adhesive. FIG. 7 illustrates a cable holder 70 similar in construction to the embodiment of FIG. 3, with the slot 73 on the narrow or short side instead of the "top" or "bottom" of the base portion as shown in FIG. 3. FIGS. 8 and 9 illustrate yet two other embodiments 80 and 90 in which the slots 83 and 93 are formed in both directions across the top or bottom of the base portions 82 and 92 respectively, and which include gripping materials 84 and 94 which may also alternatively be formed of adhesive. In FIG. 18, the base portion 130 is plastic with an adhesive 132 and a peel off membrane 134. Plastic snap 136 is sized to grip a mouse cable. Preferred dimensions are 2 inches (137), ⅛–¼ inch (138) and ⅛–¼ inch (139).

Figure 13:
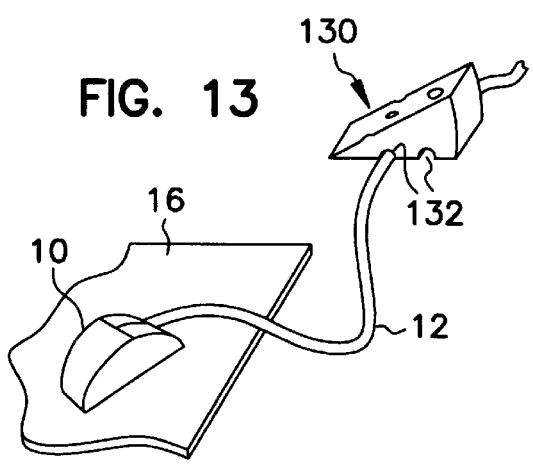
Figure 14:
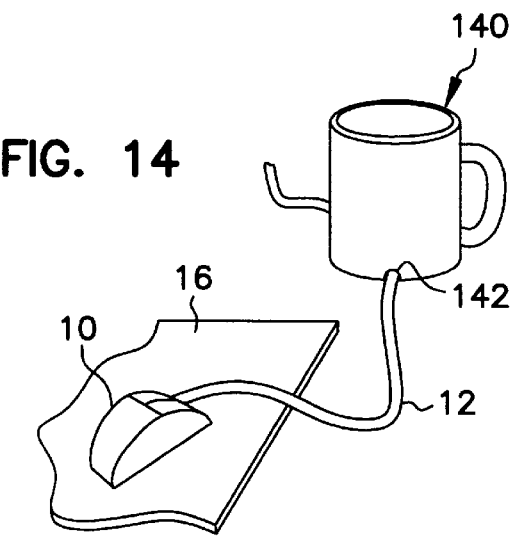
Figure 17:
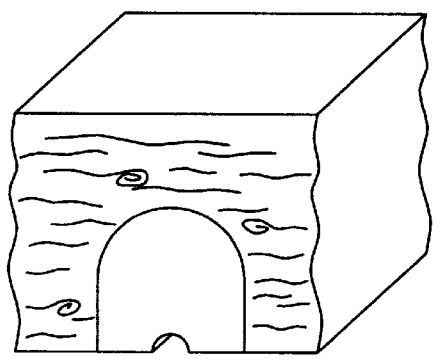

In all of the cases of embodiments 1–9 and 15, it is contemplated that the base portion may be shaped in any arbitrary manner, and in particular to replicate another object, such as the Swiss cheese embodiment of FIG. 13. The base portion might also be designed, for instance as shown in FIG. 17, to resemble an arched mouse hole in a wall. In any event, it is contemplated that forming the base to appear like familiar objects or any arbitrary design, or otherwise, to create a novelty item, is contemplated. In yet another embodiment, the mouse cable holder takes the form of an ordinary coffee cup with the words "mouse cable holder" or other indicia indicating its intended use, in English or other language, on its side or handle (not illustrated). If desired, the coffee cup may be constructed to include a slot 142 in its base, sized to grip the cable 12, as for example illustrated in FIG. 14, and as also employed in the various other embodiments described herein.

Figure 11:
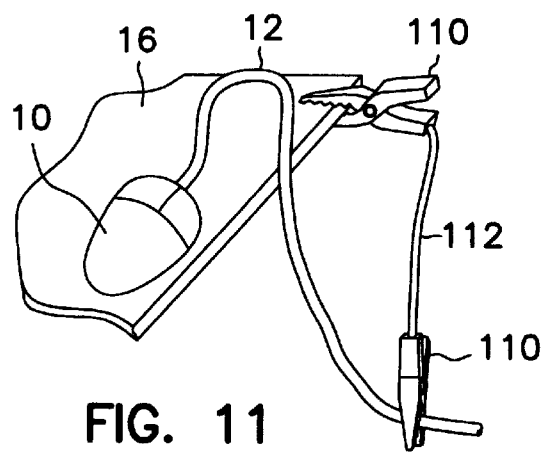

In yet another embodiment shown in FIG. 11, a mouse pad includes a tethering cord 112 (made of wire, plastic, natural fiber or other materials), extending from the mouse pad a length that is equal to the amount of slack sought for the mouse cable, for example 8–9 inches. At the end of the string is an alligator clip 110 or other means for fastening (including but not limited to an adhesive tape) the end of the sting or cord to the mouse cable. The string or cord thus prevents the mouse cable at the point it is fixed to the string or cord from extending more than the length of the string or cord away from the mouse pad, thus providing the desired slack. As shown in FIG. 11, the cord 112 is attached to the mouse pad with another clip 110 (or alternatively clip 110 could comprise an adhesive patch that can be stuck to a surface). However, alternatively the cord 112 can be permanently attached to the mouse pad at one end with other fasteners such as glue or staples. Alternatively, the mouse cable 12 can be manufactured with a cord 112 permanently attached at a point such as that shown in FIG. 11. This attachment could be done with adhesive or hot melt, or mechanical means.

Figure 10:
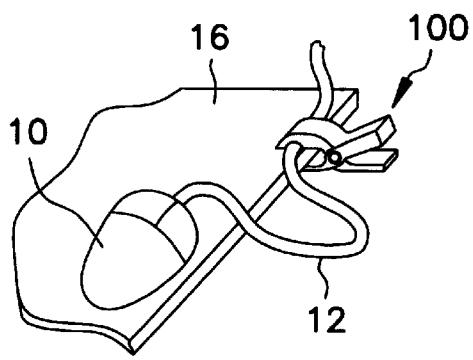
Figure 19:
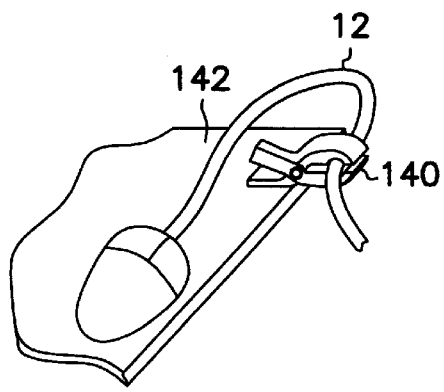

Alternatively, as shown in FIG. 10, the cable 12 can be attached to mouse pad can 16 with a clip 100 fastener such as an alligator clip, or the mouse pad provided with some other type of fastener that is permanently attached to mouse pad. In this embodiment, the mouse cable is fastened close to the pad so that the desired slack may be maintained as for example shown in FIG. 10. In yet another alternate embodiment, shown in FIG. 19, a fastener 140 is attached permanently to mouse pad 142 at the time of manufacture. The fastener 140 can be of any design suitable to hold the mouse cable in a fixed position. Preferably, it is attached to (or integrally formed with) the mouse pad in a corner, as shown in FIG. 19, so that the cable can be held to extend straight away from the mouse pad along a line parallel to a side. Preferably, the mouse pad includes a top surface suitable for providing enough rolling friction to the rolling ball disposed on the underside of the mouse, and a bottom surface which will grip a hard, smooth surface such as a desktop. In particular, a mouse pad may be constructed of a foam rubber base covered with flat, textured natural cloth or artificial fiber material that provides good rolling friction to the mouse ball.

Figure 12:
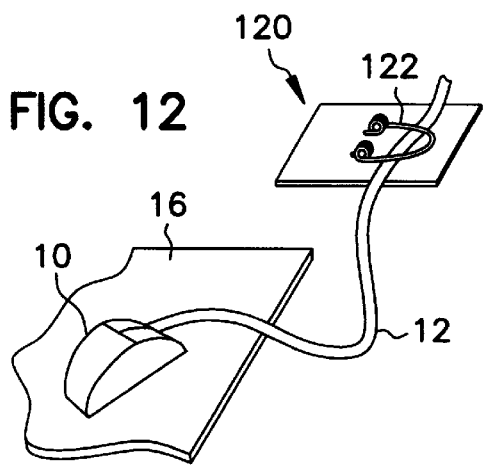

Yet another alternate embodiment is shown in FIG. 12. In FIG. 12, the mouse cable holder 120 takes the form of a device that appears to be or actually is a mouse trap with a spring-loaded trap member 122 that grips the mouse cable between the base of the holder 120 and the trap member. Preferably, holder 120 included a gripping material on its base as shown with respect to FIG. 2 for instance, or an adhesive as shown with respect to FIG. 4. In any event, the holder 120 includes a spring-loaded member or a replica thereof to grip the mouse cable 12.

Figure 16:
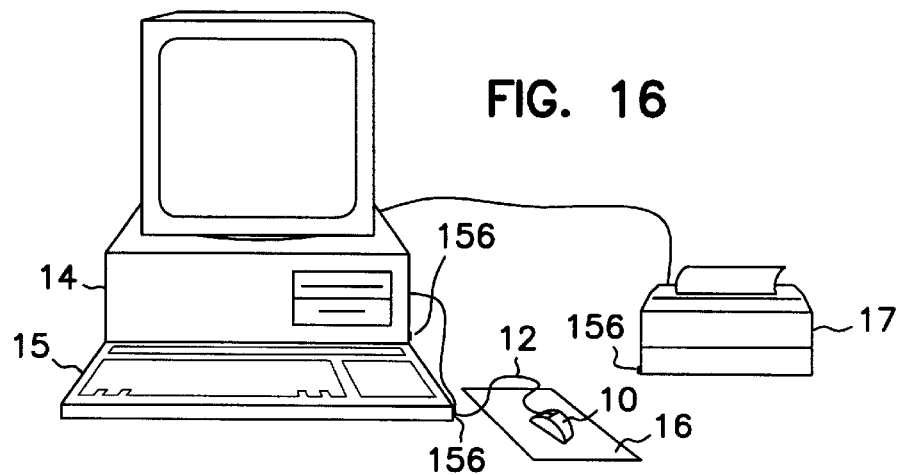
Figure 16A:
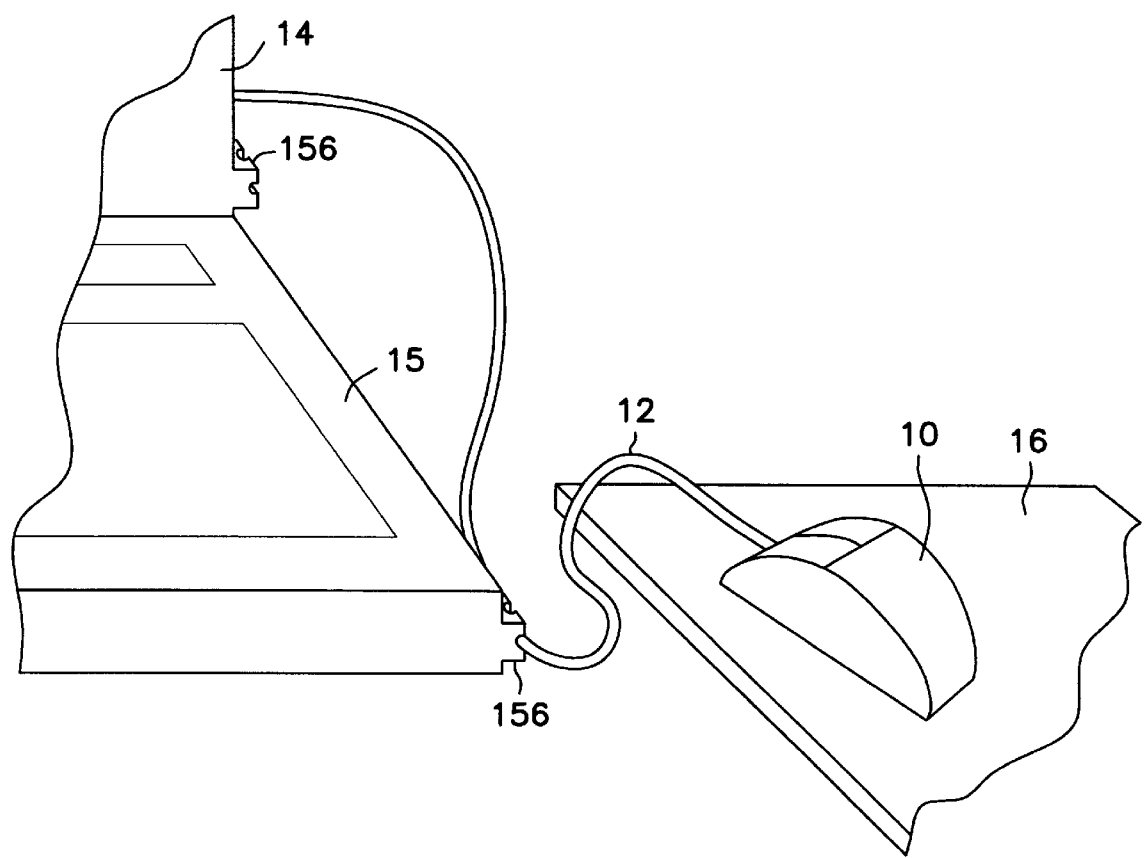

Yet another embodiment of the invention provides that molded plastic housing 15 of a personal computer keyboard is adapted with a slot 156 that the cable 12 can be interference fit in as for example shown with respect to FIG. 2. A user of a mouse can then insert the cable 12 at the appropriate place along its length into the computer keyboard slot 156, and thereby fix the position of the cable 12 to provide the desired amount of slack. The slot 156 could also be molded into the housing of the computer chassis 14 or printer 17, for example as shown in FIG. 16a. While the interference fit slot approach is believed most desirable since it is easily molded into a plastic housing, the invention is not limited to this type of fastener only. Other fasteners that can be molded into, or made integral or simultaneously with the manufacture of the plastic housing of a computer component are also preferred, particularly if they add little or no additional cost to the component, such as would be the case if the amount of extra plastic required to form the component were less than $0.20 in 1996 dollars. As used herein, the term "integral" means that the fastener is created from the mold or molds used to create other parts of the keyboard that are not specific to the fastener, and that these parts are created at the same time from the same mold or molds. Alternatively, a fastener for gripping the mouse cable may be non-integrally attached to a housing component, for example using a screw or glue.

Described above are a number of alternate embodiments of the a mouse connector holder for holding a mouse cable 12 in a stationary position with respect to the mouse housing 10 so that there is sufficient slack. The invention also contemplates a kit which includes a device which can hold the cable 12 in place with the desired slack, and instructions showing how to install the device and use it for this purpose. The device provided with the kit can be any one of the above-described devices specially adapted for this function or others that can be used for the purpose of fixing the cable 12 in place as contemplated herein.

The invention also contemplates methods of fixing a cable 12 in place using a specially adapted device, as for instance described above, in which the devices are all adapted to hold or fasten to a cable 12 of about ⅛ inch, or the currently prevailing average size of cables 12. This method comprises the steps of providing a device specially adapted for the purpose of holding a cable 12 of a mouse, and then using the device for holding the cable 12 with sufficient slack for comfortable and efficient use of the mouse housing 10. Preferably, as noted above, the cable is preferably fastened to the cable holder at a point along its length about 12–24 inches from the mouse.

What is claimed is:

1. Computer apparatus comprising a computer system including a mouse having a mouse housing and a mouse cable electrically connecting the mouse housing to the computer system, and a computer keyboard having a housing constructed at least in part of molded plastic, the keyboard housing being separate from a computer system housing containing a central processing unit for the computer, wherein the mouse cable is physically fastened to the computer system housing, the keyboard connected to the computer system housing with a keyboard cable, the keyboard housing including a fastener molded as an integral unitary one-piece construction with the molded plastic housing holding the mouse cable in fixed relation to the keyboard at a point along its length between the mouse and where it is physically fastened to the computer system housing in a position which provides a desirable amount of slack in the cable to move the mouse housing about in an area sufficient for its use, wherein the fastener is adapted for holding a mouse cable having a diameter less than that of a keyboard cable extending from the keyboard housing and further wherein at least a portion of the fastener is not adapted to engage or hold the keyboard cable.

2. Apparatus according to claim 1 wherein the fastener is adapted to hold a mouse cable of about 1/8 inch in outside diameter.

3. Apparatus according to claim 2 further wherein the fastener is adapted to hold the mouse cable by interference fit.

4. Computer apparatus comprising a computer system including a mouse having a mouse housing and a mouse cable connecting the mouse housing to the computer system, the computer system including a personal computer having a computer housing for holding a CPU and related computer circuitry, wherein the mouse cable is physically fastened in the computer housing, and a keyboard having a housing which is separate from the computer housing but connected to the computer housing with a keyboard cable, the computer housing constructed at least in part of molded plastic, the personal computer connected as part of the computer system, the computer housing including a fastener molded as an integral unitary one-piece construction with the molded plastic of the computer housing holding the mouse cable in fixed relation to the computer housing at a point along its length between the mouse and where the mouse cable is physically fastened in the computer housing in a position which provides a desirable amount of slack in the cable to move the mouse housing about in an area sufficient for its use, wherein the fastener is adapted to hold a mouse cable having a diameter less than that of a power cord extending from the computer housing and further wherein at least a portion of the fastener is not adapted to engage or hold the power cord.

5. Apparatus according to claim 4 wherein the fastener is adapted to hold a mouse cable of about 1/8 inch in outside diameter.

6. Apparatus according to claim 5 further wherein the fastener is adapted to hold the mouse cable by interference fit.

\* \* \* \* \*